Aug. 20, 1929. A. J. LANE Re. 17,407

VEGETABLE SPRAY

Original Filed Sept. 23, 1926

INVENTOR
A. J. Lane
BY Jack W. Ashley
ATTORNEY

Reissued Aug. 20, 1929.

Re. 17,407

UNITED STATES PATENT OFFICE.

ARTHER J. LANE, OF HOUSTON, TEXAS, ASSIGNOR TO LANE VEGETABLE SPRAY COMPANY, OF DALLAS, TEXAS, A CORPORATION OF TEXAS.

VEGETABLE SPRAY.

Original No. 1,653,809, dated December 27, 1927, Serial No. 137,363, filed September 23, 1926. Application for reissue filed April 15, 1929. Serial No. 355,368.

This invention relates to new and useful improvements in sprays and it has especial reference to a water spray adapted to be associated with a display stand, its object being primarily to maintain in fresh condition the vegetables, flowers, produce and the like upon display, thus adding materially to the appearance and life of the merchandise.

A further object of the invention resides in its extremely simple and economical construction and its capability of being readily dismantled for cleaning and other purposes.

Figure 1:
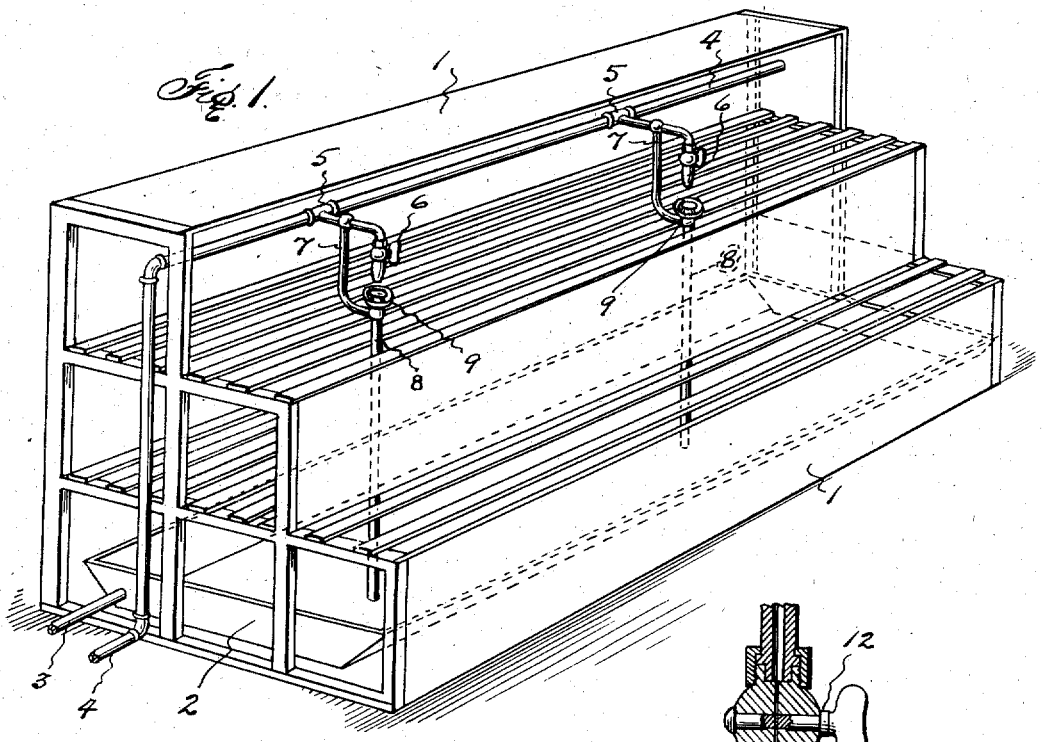
Figure 2:
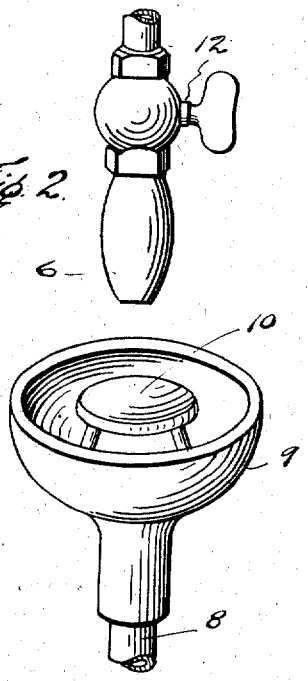
Figure 3:
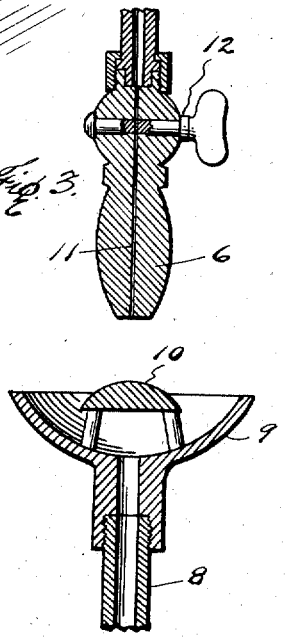

With these foremost objects in view, the invention has additional objects and advantages, both in operation and assembly of parts, which will disclose themselves more fully as the description proceeds, taken in connection with the accompanying drawings, wherein:

Fig. 1 represents a perspective view of the display stand, showing the improved sprays operatively positioned, Fig. 2 represents a perspective view of the spray units including the nozzle and baffle, and Fig. 3 is a vertical cross-sectional view of the nozzle and baffle in operative position.

Continuing more in detail with the drawings, the reference character 1 designates a vegetable and produce display stand of a conventional build, having therebeneath a drainage basin 2, the latter being provided with a drain pipe 3.

A water pipe 4 enters the stand and being suitably attached thereto, extends preferably along near the top thereof as shown, in order that the spray or mist created by the invention may effectively penetrate all parts of the stand. At equispaced distances along the horizontal portion of the pipe 4, T's 5 are applied, which carry the nozzles 6, a part of the invention, and illustrated in Figs. 2 and 3 especially.

A bracket 7 is attached to and depends from the outwardly extending portion of the T's and is so arranged as to support a vertically arranged pipe 8, upon the upper end of which is screwed a concave cup 9, containing the removable deflector or baffle 10. This latter element is adapted to be disposed in precise alinement with the nozzle 6, through which a minute aperture 11 extends for the discharge of water, and being controlled by the conventional valve 12. The long aperture 11 causes the water to discharge in the form of a fine needle jet. It is arranged that the pipe 8 be movable vertically with respect to the bracket 7, by which adjustment of the deflector 10, relative to the nozzle 6 may be accomplished to better control the mist created.

When the parts 6 and 9 are relatively adjusted to obtain proper position of the baffle 10, the valve 12 is opened and the force of the liquid through the small aperture 11 of the nozzle impinging the convex surface of the baffle, emits a fine mist or spray, superfluous water being caught in the concave cup 9 and conveyed into the drainage basin 2. The mist formed envelopes the merchandise, and the major portion of any excess mist will eventually find its way into the basin also.

It will be noted that the upper convex surface of the deflector 10 partly extends above the rim of the cup 9, particularly the central area upon which the fine jet of water impinges and this structure promotes a more efficient diffusion. The convex surface is, of course, a much better deflector for a downwardly directed jet than either a concave surface or a flat surface. Further, water will more readily flow from a convex surface than from a concave surface. It is highly desirable to emit a mist which is free from drops of water and the advantages of such a mist are that the perishable products being sprayed will not be over-saturated and also the customer may readily handle the products without injury to clothing or disagreeable effects.

For the purpose of cleaning, the elements are so constructed as to be readily dismantled, that is, the baffle 10 may be removed, should at any time the drain pipe 8 become stopped or require cleaning.

Manifestly, the construction shown is capable of some variation, and such variation as is within the scope of the appended claims, is considered within the spirit of the invention.

What I claim, is:

1. A spray device including with a water supply pipe, a lateral section communicating with said supply pipe and having its remote end directed downwardly, a nozzle carried by said remote end and having a restricted valve-controlled opening therein, a bracket suspended by said lateral section, a drain pipe supported by said bracket in alinement with said nozzle, an apertured concave receptacle threadedly mounted on and centrally communicating with the inlet end of said drain pipe beneath said nozzle, and a convex deflector mounted upon legs centrally within said concave receptacle with its operative face protruding slightly above the side of said receptacle, and against which the discharge of said nozzle is directed whereby to effect unrestrained diffusion of said discharge in all directions.

2. In a spray device, an elevated water pipe, a downwardly directed nozzle connected with said pipe and discharging a fine jet of water downwardly, a drain pipe below the water pipe, a cup at the upper end of the drain pipe, and a deflector entirely within the margin of the cup having a convex surface impinged by the fine jet of water, whereby a mist is emitted beyond the margin of the cup free from drops of water, the convex surface of the deflector also acting to induce the flow of excess water to the cup.

3. In a spray device, a water supply pipe, a nozzle connected with said supply pipe for discharging a fine jet of water, a drain pipe, a water-collecting cup carried by the drain pipe, a deflector carried by the cup and positioned to be impinged by the water jet, and a bracket rigidly connecting the pipes, whereby the nozzle and deflector are relatively positioned.

4. In a spray device, an elevated nozzle discharging downwardly a needle jet of water, a deflector spaced below the nozzle and having an imperforate and unobstructed convex upper surface the central area of which is impinged by the jet of water, and a cup entirely surrounding the deflector and having its upper edge below the central area of said deflector, the jet of water being so fine and the upper surface of the deflector being such as to cause the diffusion of the water in a mist free from drops of water.

5. In a spray device, an elevated nozzle discharging downwardly a needle jet of water, a deflector spaced below the nozzle and having an imperforate and unobstructed convex upper surface the central area of which is impinged by the jet of water, a cup entirely surrounding the deflector and having its upper edge below the central area of said deflector, the jet of water being so fine and the upper surface of the deflector being such as to cause the diffusion of the water in a mist free from drops of water, and means for rigidly holding the nozzle and deflector in spaced relation and also for centering the jet on the deflector.

6. In a spray device, a water supply pipe, a supporting bracket secured at one end to said pipe and having vertical and horizontal arms, a drain cup located at the end of the horizontal arm of the bracket, a nozzle extending from the water pipe parallel to the vertical arm of the bracket for ejecting a water jet, and a deflector located above the base of said cup and spaced from the margin thereof to drain at its edge into the cup, said deflector being alined with the jet from the nozzle for diffusing said jet in a mist.

7. As a sub-combination in a spray device, a circular cup having a central drain opening, a circular deflector disposed concentrically within the margin of the cup and having an upper convex surface above the rim of said cup, and means for supporting said deflector above the drain opening and within the cup.

In testimony whereof I affix my signature.

ARTHER J. LANE.